(12) United States Patent
Fukuta (10) Patent No.: US 11,107,500 B2
(45) Date of Patent: Aug. 31, 2021

(54) MAGNETIC DISK DEVICE AND METHOD

(71) Applicants: Kabushiki Kaisha Toshiba, Tokyo (JP); Toshiba Electronic Devices & Storage Corporation, Tokyo (JP)

(72) Inventor: Kazuo Fukuta, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/816,735

(22) Filed: Mar. 12, 2020

(65) Prior Publication Data

US 2021/0043230 A1    Feb. 11, 2021

(30) Foreign Application Priority Data

Aug. 9, 2019   (JP) .............................. JP2019-147664

(51) Int. Cl.
  *G11B 33/14*   (2006.01)
  *G11B 33/08*   (2006.01)
  *G11B 19/04*   (2006.01)

(52) U.S. Cl.
  CPC .......... *G11B 19/042* (2013.01); *G11B 19/046* (2013.01)

(58) Field of Classification Search
  CPC ..... G11B 33/08; G11B 33/14; G11B 33/1406; G11B 33/1446; G11B 27/36; G11B 19/042; G11B 19/043; G11B 19/046; G11B 9/047

USPC .................................... 360/75, 97.12, 97.19
See application file for complete search history.

(56) References Cited

U.S. PATENT DOCUMENTS

| 7,251,094 B2 | 7/2007 | Miyano |
| 9,798,499 B2 | 10/2017 | Bazzani |
| 10,684,905 B2* | 6/2020 | Koizumi ................. G06F 1/263 |
| 2006/0215307 A1 | 9/2006 | Yoshida et al. |
| 2009/0249109 A1 | 10/2009 | Aoki |
| 2010/0067357 A1* | 3/2010 | Huang ............... G11B 5/59627 |
|  |  | 369/247.1 |
| 2018/0276066 A1 | 9/2018 | Koizumi |

FOREIGN PATENT DOCUMENTS

| JP | 2003-109293 A | 4/2003 |
| JP | 2005-267799 A | 9/2005 |
| JP | 2006-269006 A | 10/2006 |
| JP | 2007-149299 A | 6/2007 |
| JP | 2009-238277 A | 10/2009 |
| JP | 6451764 B2 | 1/2019 |

* cited by examiner

*Primary Examiner* — Nabil Z Hindi
(74) *Attorney, Agent, or Firm* — White & Case LLP (57) ABSTRACT

According to one embodiment, a magnetic disk device includes a magnetic disk, a magnetic head, a sensor, a non-volatile semiconductor storage device, and a controller. The magnetic head performs writing and reading to and from the magnetic disk. The sensor detects a degree of a physical influence applied from an outside. The controller generates a log when a detection value detected by the sensor satisfies a condition for abnormality determination, and stores the log in the non-volatile semiconductor storage device in response to generation of the log.

11 Claims, 8 Drawing Sheets

MAGNETIC DISK DEVICE AND METHOD

CROSS-REFERENCE TO RELATED APPLICATIONS

This application is based upon and claims the benefit of priority from Japanese Patent Application No. 2019-147664, filed on Aug. 9, 2019; the entire contents of which are incorporated herein by reference.

FIELD

Embodiments described herein relate generally to a magnetic disk device and a method.

BACKGROUND

In the related art, a magnetic disk device generally records information at time of abnormality occurrence on a magnetic disk. Thus, in a case where a magnetic head, a magnetic disk, a spindle motor, a motor driver integrated circuit (IC), or a head integrated circuit (IC) is broken, an access to the magnetic disk is not possible. Thus, it is not possible to acquire the information at time of abnormality occurrence.

For example, when a magnetic disk device is returned from the market to the manufacturer, since the manufacturer cannot acquire the information at time of abnormality occurrence for the above-described reason, it is likely that the manufacturer cannot investigate the cause of the occurrence of the abnormality.

DETAILED DESCRIPTION

According to embodiments, a magnetic disk device includes a magnetic disk, a magnetic head, a sensor, a non-volatile semiconductor storage device, and a controller. The magnetic head performs writing and reading to and from the magnetic disk. The sensor detects a degree of a physical influence applied from an outside. The controller generates a log when a detection value detected by the sensor satisfies a condition for abnormality determination, and stores the log in the non-volatile semiconductor storage device in response to generation of the log.

Hereinafter, a magnetic disk device and a method according to embodiments will be described in detail with reference to the accompanying drawings. The present invention is not limited to the embodiments.

First Embodiment

Figure 1:
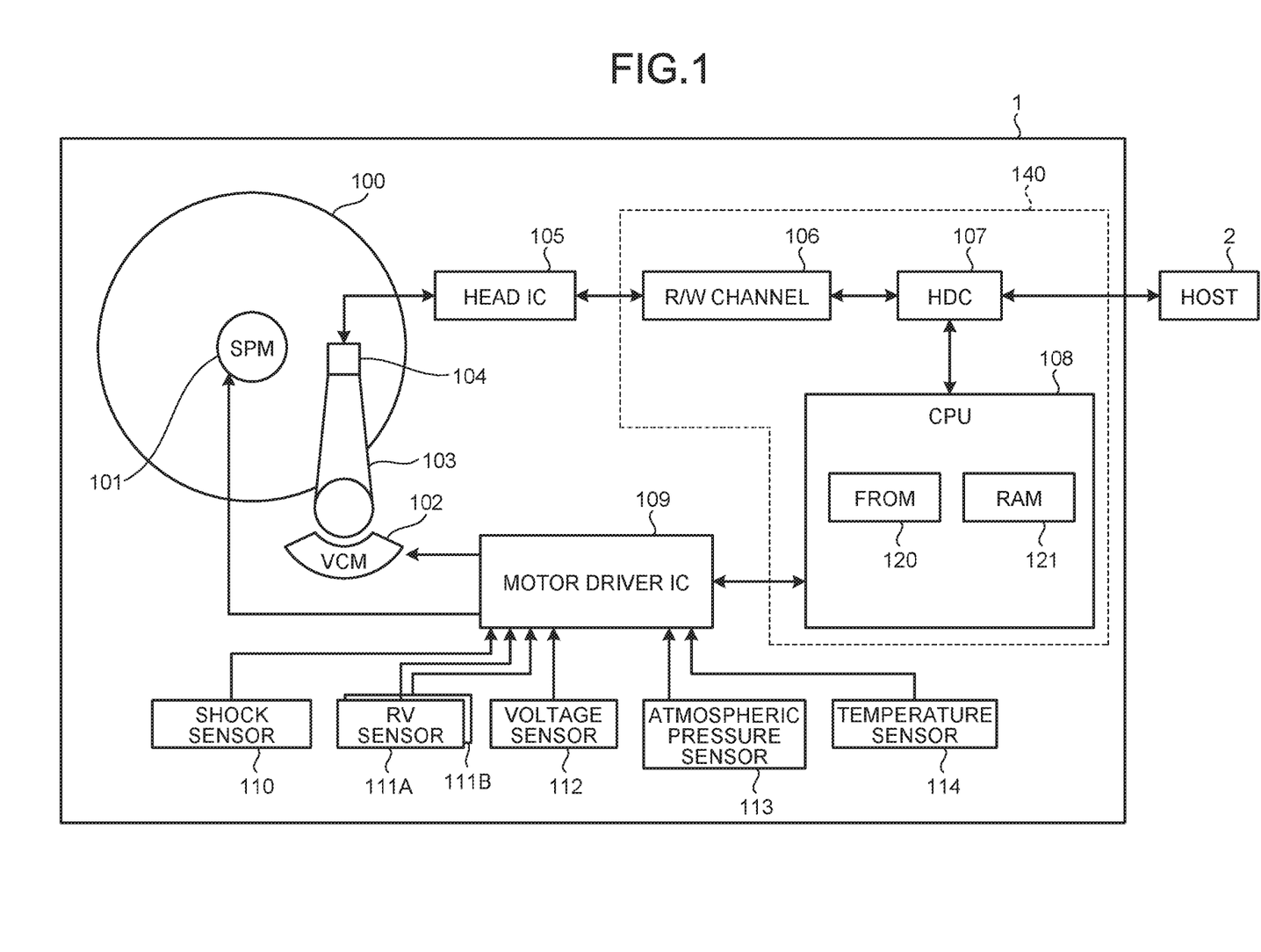
FIG. 1 is a schematic diagram illustrating an example of a configuration of a magnetic disk device according to a first embodiment.

FIG. 1 is a schematic diagram illustrating an example of a configuration of a magnetic disk device 1 according to a first embodiment.

The magnetic disk device 1 is connectable to a host 2. The host 2 is a computer device that issues commands for causing the magnetic disk device 1 to perform desired operations. For example, the commands include a write command for writing data into the magnetic disk device 1 and a read command for reading data from the magnetic disk device 1. The host 2 is a server or a personal computer, for example.

The magnetic disk device 1 includes a magnetic disk 100, a spindle motor (SPM) 101, a voice coil motor (VCM) 102, a head actuator 103, a magnetic head 104, a head IC 105, a read and write (R/W) channel 106, a hard disk controller (HDC) 107, a central processing unit (CPU) 108, a motor driver IC 109, a shock sensor 110, a pair of rotational vibration (RV) sensors 111A and 111B, a voltage sensor 112, an atmospheric pressure sensor 113, and a temperature sensor 114.

The R/W channel 106, the HDC 107, and the CPU 108 are mounted on a control board 140. The R/W channel 106, the HDC 107, and the CPU 108 mounted on the control board 140 constitute a controller in the embodiment. The components of the controller are not limited thereto. The controller may be constituted by some of the R/W channel 106, the HDC 107, and the CPU 108. The controller may include any component other than the R/W channel 106, the HDC 107, and the CPU 108.

The magnetic disk 100 is a storage medium in which a magnetic layer is formed on a disc-like object such as an aluminum or glass substrate.

Figure 2:
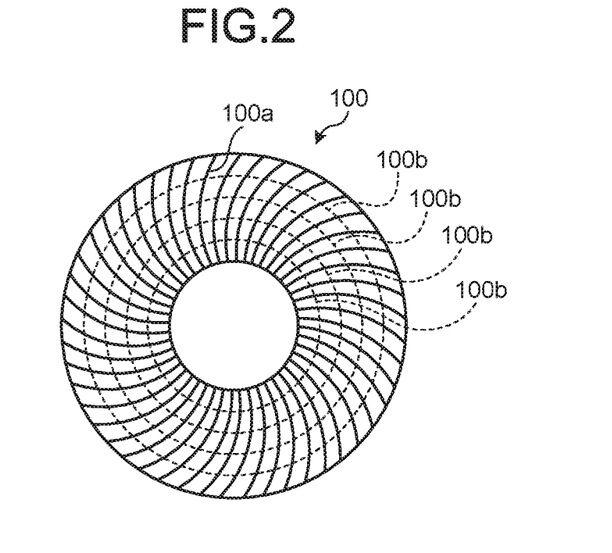
FIG. 2 is a diagram illustrating an example of a configuration of a magnetic disk according to the first embodiment.

FIG. 2 is a diagram illustrating an example of a configuration of the magnetic disk 100 according to the first embodiment. Servo information is written in the magnetic layer formed on the surface of the magnetic disk 100, for example, by a servo writer or the like, before shipment. The servo information may be written to the magnetic disk 100 by self-servo write (SSW) after shipment. FIG. 2 illustrates servo zones 100*a* radially arranged on the magnetic disk 100, as an example of arrangement of servo zones in which the servo information is written. A plurality of concentric tracks 100*b* are provided at a predetermined pitch in a radial direction of the magnetic disk 100. Multiple sectors are sequentially formed on the circumference of each track 100*b*. Data is written and read into and from each sector by the magnetic head 104 described later.

Descriptions will be made returning to FIG. 1. The SPM 101 rotates the magnetic disk 100.

The magnetic head 104 is attached to the tip of the head actuator 103. The magnetic head 104 is supported by the head actuator 103 so as to face a recording surface of the magnetic disk 100.

The VCM 102 drives the head actuator 103. Thus, the magnetic head 104 attached to the tip of the head actuator 103 can move relative to the recording surface of the magnetic disk 100.

The magnetic head 104 writes or reads data into or from the magnetic disk 100 (more specifically, the magnetic layer of the magnetic disk 100).

The head IC 105 is an amplifier that amplifies a signal read from the magnetic disk 100 by the magnetic head 104 and a signal to be written to the magnetic disk 100 by the magnetic head 104.

The R/W channel 106 encodes data to be written to the magnetic disk 100 and decodes a signal read from the magnetic disk 100.

The HDC 107 is connected to the host 2 to transmit and receive data and commands to and from the host 2. The HDC 107 controls writing and reading of data into and from the magnetic disk 100.

The motor driver IC 109 drives the SPM 101 and the VCM 102. The motor driver IC 109 acquires detection values obtained by the shock sensor 110, the RV sensors 111A and 111B, the voltage sensor 112, the atmospheric pressure sensor 113, and the temperature sensor 114, and transmits the acquired detection values to the CPU 108.

The shock sensor 110, the RV sensors 111A and 111B, the voltage sensor 112, the atmospheric pressure sensor 113, and the temperature sensor 114 are sensors that detect the degrees of physical influences applied to the magnetic disk device 1 from the outside. The physical influences include shock, vibration, a voltage of supplied electricity, an atmospheric pressure, a temperature, and the like. The detection value detected by the sensor represents a degree of a physical influence with numerical information. The numerical information may be any value which represents the degree of the physical influence. For example, the numerical information obtained by the sensor may be expressed in any known unit system. Alternatively, the numerical information obtained by the sensor may not be expressed in a known unit system, but be an index having a correlation with the degree of the physical influence. For example, the detection value of the temperature sensor 112 may be numerical information expressed in Celsius, Fahrenheit, or K (Kelvin), or may be numerical information which has a value increasing as the temperature becomes higher and is expressed differently from the above-described unit system.

The RV sensors 111A and 111B detect the amount of vibration of the magnetic disk 100 in a substantially circumferential direction.

Figure 3:
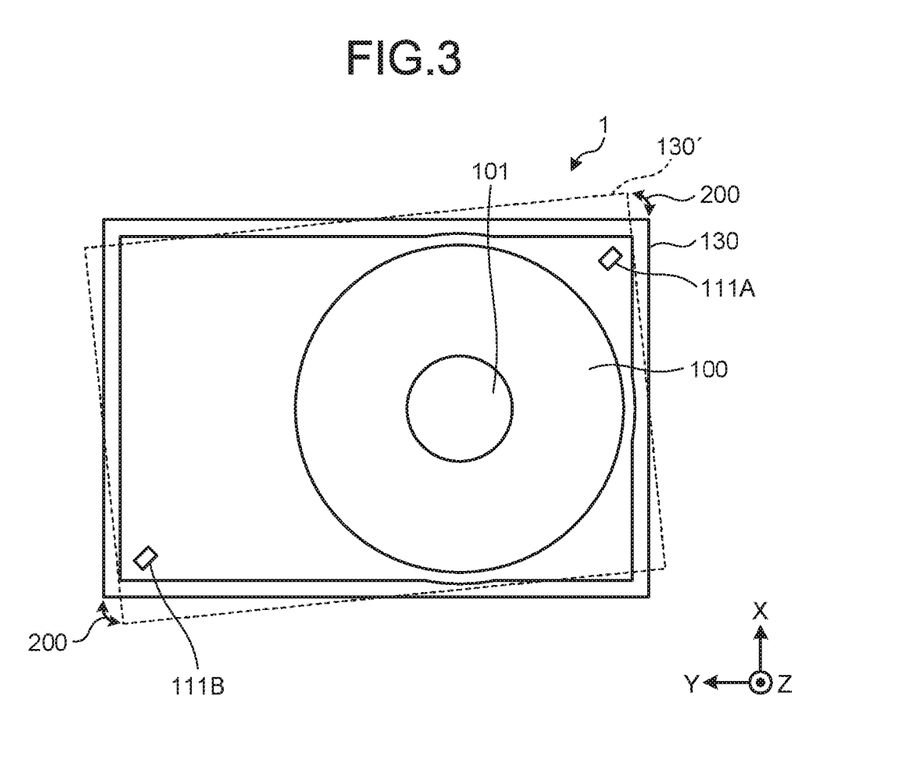
FIG. 3 is a schematic diagram illustrating an example of arrangement of a rotational vibration (RV) sensor in the first embodiment.

FIG. 3 is a schematic diagram illustrating an example of arrangement of the RV sensors 111A and 111B in the first embodiment. In FIG. 3, a lateral direction of a housing 130 of the magnetic disk device 1 is set to an X-direction, a longitudinal direction thereof is set to a Y-direction, and a thickness direction (that is, an axial direction of the SPM 101) is set to a Z-direction.

The RV sensors 111A and 111B are provided at two corner portions in the housing 130 of the magnetic disk device 1, which face each other in a diagonal direction. Each of the RV sensors 111A and 111B is capable of detecting the amount of vibration in the X-direction and the Y-direction. A difference between the detection value of the RV sensor 111A and the detection value of the RV sensor 111B is amplified by a differential amplifier (not illustrated), and thus the amount of vibration in the substantially circumferential direction of the magnetic disk 100 is directly detected. The amount of vibration in the substantially circumferential direction of the magnetic disk 100 corresponds to the amount of vibration in a direction indicated by an arrow 200, for example, when the housing 130 moves to a position 130'.

The RV sensors 111A and 111B may detect the amount of vibration as a displacement amount, a velocity, an acceleration, or any other physical quantity.

The position in which the differential amplifier is disposed is not limited to a specific position. In an example, the differential amplifier is located in the motor driver IC 109.

The RV sensors 111A and 111B are hereinafter collectively referred to as an RV sensor 111. The detection value obtained by the RV sensor 111 corresponds to the amount of vibration in the substantially circumferential direction of the magnetic disk 100, which is obtained based on the detection values of the RV sensors 111A and 111B.

Descriptions will be made returning to FIG. 1 again. The shock sensor 110 is capable of detecting the amount of vibration in each of the X, Y, and Z directions. The amount of vibration detected by the shock sensor 110 is a displacement amount, a velocity, an acceleration, or any other physical quantity. The motor driver IC 109 or the CPU 108 composes the amounts of vibration in the X, Y, and Z directions detected by the shock sensor 110 and calculates the amount of vibration in a vibration direction. The component that calculates the amount of vibration in the vibration direction is not limited to the motor driver IC 109 and the CPU 108.

It is assumed below that the detection value obtained by the shock sensor 110 means the amount of vibration in the vibration direction.

The voltage sensor 112 detects the voltage of electricity supplied to the magnetic disk device 1 from the outside.

The atmospheric pressure sensor 113 detects atmospheric pressure.

The temperature sensor 114 detects the temperature.

Any circuits such as an analog digital (AD) converter, an amplifier, or a filter circuit may be interposed on a lead line on which signals output by various sensors (shock sensor 110, RV sensors 111A and 111B, voltage sensor 112, atmospheric pressure sensor 113, and temperature sensor 114) are acquired by the motor driver IC 109 as the detection values. As a standard for the bus connecting the various sensors to the motor driver IC 109, any standard may be employed. For example, I2C may be employed as the standard of the bus. The various sensors may be connected to the CPU 108, the HDC 107, or the like instead of the motor driver IC 109.

The CPU 108 comprehensively controls the operation of each component in the magnetic disk device 1.

The CPU 108 includes a flash read only memory (FROM) 120 and a random access memory (RAM) 121.

The FROM 120 is an example of a non-volatile semiconductor storage device. As the non-volatile semiconductor storage device, a semiconductor storage device other than the FROM, for example, a magnetoresistive random access memory (MRAM) or a phase-change memory (PCM) may be employed. Further, when the magnetic disk device 1 is configured as a solid state drive (SSD) or a hybrid hard disk drive (HDD) including a NAND type flash memory, the SSD or the NAND type flash memory may be used for the non-volatile semiconductor storage device according to the embodiment.

A firmware program is stored in the FROM 120, in advance. The CPU 108 implements the above-described control by loading the firmware program stored in the FROM 120 into the RAM 121 and executing the firmware program loaded in the RAM 121. The CPU 108 may use the RAM 121 as a work area when performing the above-described control.

The CPU 108 determines whether or not an abnormal physical influence is applied from the outside of the magnetic disk device 1, as a part of the control.

Specifically, the CPU 108 determines whether or not the detection value detected by the sensor (shock sensor 110, RV sensors 111A and 111B, voltage sensor 112, atmospheric pressure sensor 113, or temperature sensor 114) satisfies a condition for abnormality determination. When the detection value detected by the sensor satisfies the condition, the CPU 108 generates an abnormality log as information at time of abnormality occurrence. The CPU 108 stores the abnormality log in the FROM 120 in response to generation of the abnormality log.

Accordingly, even when the magnetic disk device 1 is exposed to an abnormal physical influence such as an abnormal shock, an abnormal supply voltage, an abnormal atmospheric pressure, or an abnormal temperature, and thus the magnetic head 104, the magnetic disk 100, the SPM 101, the motor driver IC 109, or the head IC 105 is damaged, and reading from the magnetic disk 100 is not possible, the abnormality log can be obtained from the FROM 120.

Storing the abnormality log in the FROM 120 in response to the generation of the abnormality log means that the abnormality log is stored in the FROM 120 with the generation of the abnormality log as a trigger. Thus, when the abnormality log is generated, the abnormality log is stored in the FROM 120 without much time. Here, as an example, descriptions will be made on the assumption that the CPU 108 generates an abnormality log and then immediately stores the abnormality log in the FROM 120. Although details will be described later, the abnormality log is stored not only in the FROM 120 but also in the RAM 121. The abnormality log stored in the RAM 121 is written to the magnetic disk 100 at a timing after a while from the generation of the abnormality log, for example, a timing when the magnetic disk device 1 turns into an idle state. The CPU 108 may store the abnormality log in the FROM 120 at least before completing storing of the abnormality log in the magnetic disk 100 via the RAM 121.

The condition for abnormality determination can be arbitrarily configured so long as the condition can be used for estimating whether or not an abnormal physical influence is applied to the magnetic disk device 1 from the outside. Moreover, the condition for abnormality determination may be arbitrarily configured in accordance with the type of abnormal physical influence to be detected.

The abnormality log may include the detection values collected by the motor driver IC 109 from one or more sensors of the shock sensor 110, the RV sensors 111A and 111B, the voltage sensor 112, the atmospheric pressure sensor 113, and the temperature sensor 114 or numerical information obtained by processing the detection values. The detection values are corrected in a situation in which it is estimated that the magnetic disk device 1 receives an abnormal physical influence from the outside. The abnormality log is provided, for example, for analyzing the cause of failure of the magnetic disk device 1, and may be arbitrarily configured in accordance with an analysis method.

An example of the condition for abnormality determination and the abnormality log according to the first embodiment will be described later.

As described with reference to FIG. 2, servo information is recorded on the track at substantially equal intervals. Thus, the servo information is read at the substantially constant time intervals. After the servo information is read, an interrupt to the CPU 108 occurs. The CPU 108 and the HDC 107 performs position calculation and the like based on the servo information in response to the interrupt.

In the first embodiment, for example, when the interrupt occurs, the CPU 108 performs position calculation and the like based on the servo information, and also performs acquisition of the detection values detected by various sensors and abnormality determination. That is, every time the servo information is read, the CPU 108 acquires detection values detected by various sensors and determines an occurrence of abnormality. An interrupt occurring by reading the servo information is hereinafter referred to as a servo interrupt.

A timing of acquiring the detection values detected by the various sensors and determining the occurrence of abnormality is not limited to a timing of a servo interrupt. The CPU 108 may acquire the detection values from the various sensors at any timing and determine the occurrence of abnormality at any timing. For example, the CPU 108 or other components of the controller may normally acquire the detection values from the various sensors. Alternatively, the CPU 108 or other components of the controller may periodically acquire the detection values from the various sensors at a timing different from the timing of the servo interrupt.

Next, the operation of the magnetic disk device 1 in the first embodiment will be described.

Figure 4:
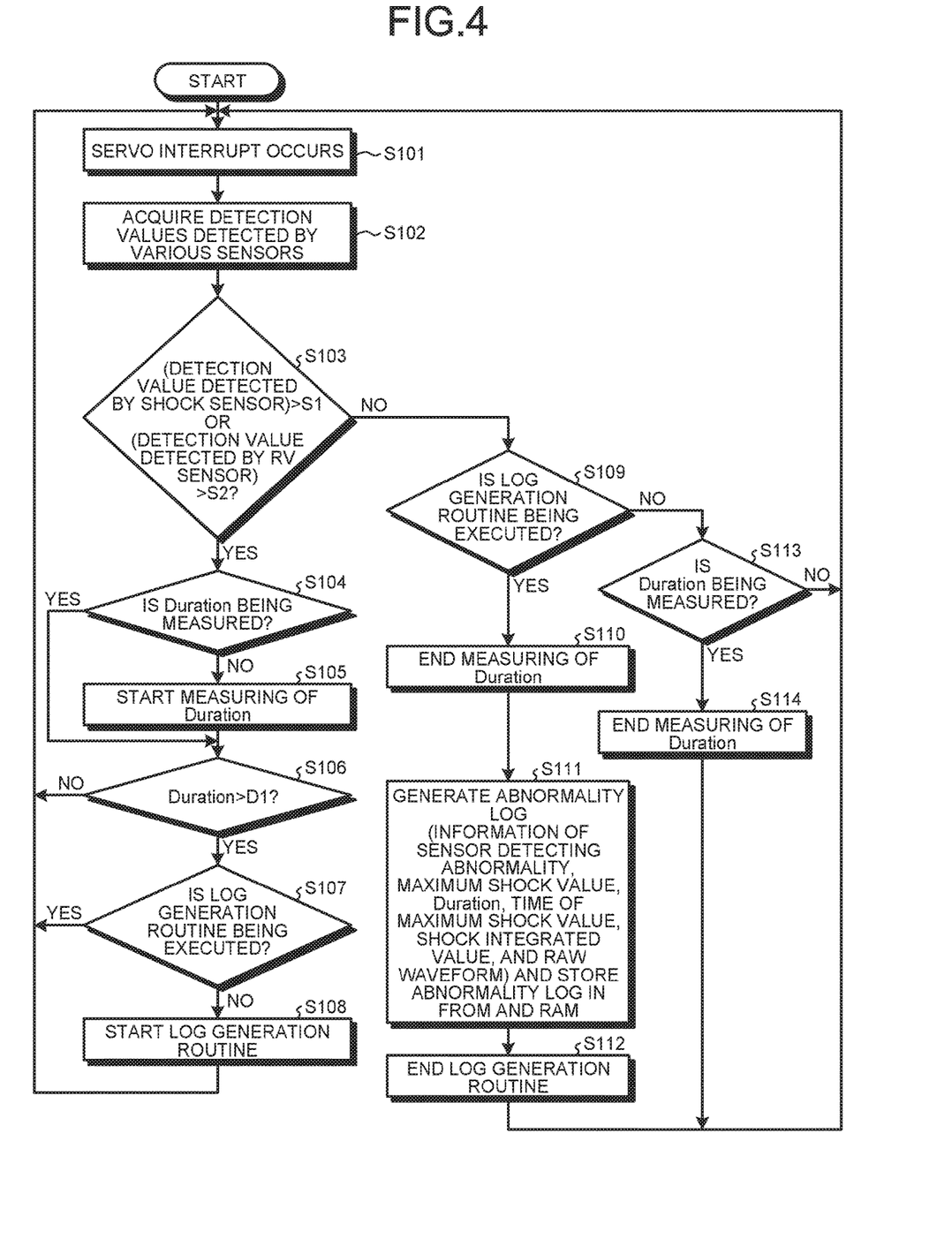
FIG. 4 is a flowchart illustrating an example of an operation of acquiring a detection value detected by a sensor and determining abnormality, according to the first embodiment.

FIG. 4 is a flowchart illustrating an example of an operation of acquiring a detection value detected by a sensor and determining abnormality, according to the first embodiment.

When a servo interrupt occurs (S101), the CPU 108 acquires detection values detected by various sensors (S102). The CPU 108 determines whether or not a condition is satisfied (S103). The condition is that the detection value detected by the shock sensor 110 exceeds a slice value S1, or that the detection value detected by the RV sensor 111 exceeds a slice value S2. The values S1 and S2 are set in advance. The value S1 is a slice value to be compared with the detection value detected by the shock sensor 110. The value S2 is a slice value to be compared with the detection value detected by the RV sensor 111.

When the condition for the determination in S103 is satisfied (S103: Yes), the CPU 108 determines whether or not a duration of a shock is being measured (S104).

The duration of a shock is described as Duration. Duration is measured for each sensor. That is, the duration of a shock includes Duration associated with the shock sensor 110 and Duration associated with the RV sensor 111. Duration associated with the shock sensor 110 is a period in which the detection value detected by the shock sensor 110 continuously exceeds the slice value S1. Duration associated with the RV sensor 111 is a period in which the detection value detected by the RV sensor 111 continuously exceeds the slice value S2. If any of the Durations is being measured, determination to be Yes is performed in the determination process of S104. If none of the Durations is being measured, determination to be No is performed in the determination process of S104.

When Duration is being measured (S104: Yes), or after S105, the CPU 108 determines whether or not any of the Durations exceeds a threshold value D1 (S106). If any of the Durations exceeds the threshold value D1 (S106: Yes), the CPU 108 determines whether or not a log generation routine is being executed (S107). When the log generation routine is not being executed (S107: No), the CPU 108 starts the log generation routine (S108).

The log generation routine is a process of generating an abnormality log. That is, in the first embodiment, the condition that the detection value by any of the shock sensor 110 and the RV sensor 111 exceeds the corresponding slice value, and Duration under measurement exceeds the threshold value D1 corresponds to the condition for abnormality determination.

For example, the log generation routine maintains an executing state until the collection of all pieces of information constituting the abnormality log is completed.

Figure 5:
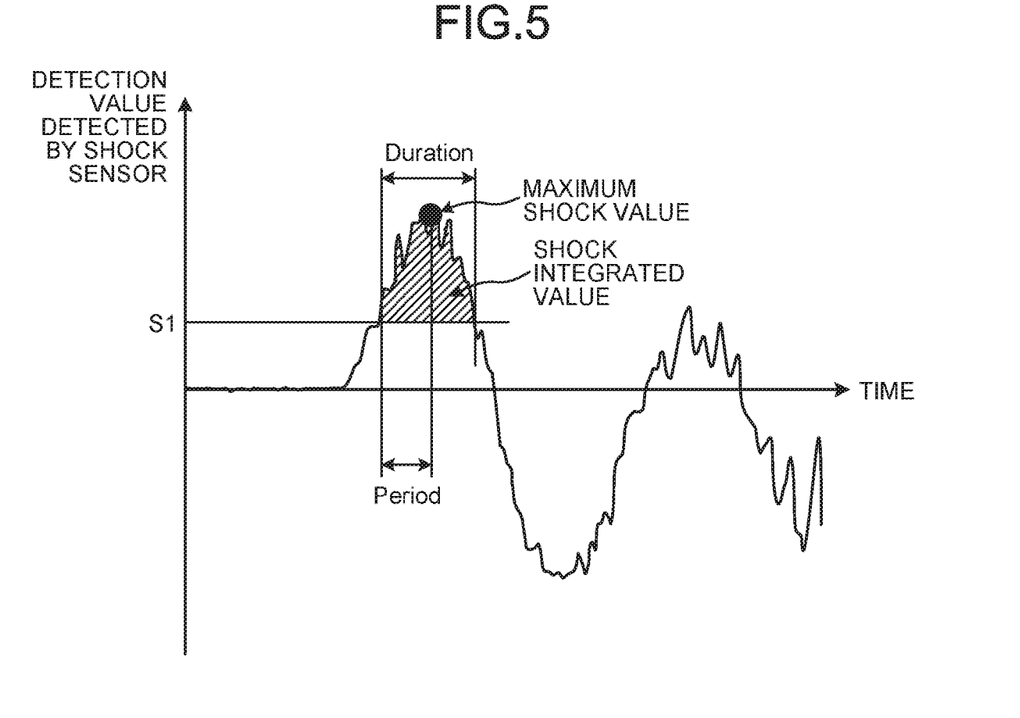
FIG. 5 is a diagram illustrating an example of a configuration of an abnormality log in the first embodiment.

FIG. 5 is a diagram illustrating an example of a configuration of an abnormality log in the first embodiment. In FIG. 5, a vertical axis indicates the detection value detected by the shock sensor 110, and a horizontal axis indicates time.

The abnormality log may include a period from a time when the detection value detected by the shock sensor 110 exceeds the slice value S1 until a time when the detection value detected by the shock sensor 110 becomes a value not exceeding the slice value S1, that is, Duration illustrated in FIG. 5. The abnormality log may include the maximum value observed during the above-described period, that is, the maximum shock value illustrated in FIG. 5. The abnormality log may include a period from a time when the detection value detected by the shock sensor 110 exceeds the slice value S1 until a time when the maximum shock value (Period) is observed. The abnormality log may include an integrated value obtained by taking the slice value S1 off the detection values observed in the period, that is, an area (shock integrated value) of a hatched portion illustrated in FIG. 5. The abnormality log may include a raw waveform formed by the detection values from a time when the detection value detected by the shock sensor 110 exceeds the slice value S1 until any time.

For example, the CPU 108 stores detection values (in particular, detection values exceeding the slice value) detected by the sensor in the RAM 121 in chronological order from a timing at which measuring of Duration is started. The CPU 108 may process information of the sensor detecting abnormality, the maximum shock value, a time when the maximum shock value is observed, the shock integrated value, and the raw waveform, based on a group of the detection values stored in the RAM 121 in chronological order. The information of the sensor detecting abnormality is information indicating a sensor that has output a detection value indicating abnormality. When generation of the abnormality log is completed (a timing of S112 which is described later) or when measuring of Duration is ended without starting the log generation routine (a timing of S114 which is described later), the group of the detection values stored in the RAM 121 may be deleted.

FIG. 5 illustrates an example of the abnormality log generated based on the detection values detected by the shock sensor 110. The CPU 108 may generate an abnormality log based on the detection values detected by the RV sensor 111 in a similar manner to the abnormality log generated based on the detection values detected by the shock sensor 110.

The abnormality log may include any information in addition to information obtained from the shock sensor 110 or information obtained from the RV sensor 111. For example, the abnormality log may include a detection value which is detected by any sensor or numerical information which is obtained by processing a detection value detected by any sensor.

Descriptions will be made returning to FIG. 4. If the log generation routine is being executed (S107: Yes), or after S108, the control returns to S101. Then, loop processing of S101 to S108 is repeated until collection of all pieces of information constituting the abnormality log is completed. In the first embodiment, since the abnormality log includes Duration, the loop processing of S101 to S108 is repeated until determination to be No is performed in the determination process of S103.

If none of the Durations exceeds the threshold value D1 (S106: No), the control returns to S101.

When the determination condition of S103 is not satisfied (S103: No), the CPU 108 determines whether or not the log generation routine is being executed (S109). When the log generation routine is being executed (S109: Yes), the CPU 108 ends the measuring of Duration (S110). Then, the CPU 108 generates an abnormality log, and immediately stores the generated abnormality log in the FROM 120 and the RAM 121 (S111). The abnormality log includes, for example, the information of a sensor detecting abnormality, the maximum shock value, Duration, the time when the maximum shock value is observed, the shock integrated value, and the raw waveform. Here, the information of a sensor detecting abnormality is information indicating a sensor having measured Duration which exceeds the threshold value D1 among the shock sensor 110 and the RV sensor 111.

According to S111, the CPU 108 ends the log generation routine (S112), and the control returns to S101.

When the log generation routine is not being executed (S109: No), the CPU 108 determines whether or not Duration is being measured (S113). When Duration is being measured (S113: Yes), the CPU 108 ends the measuring of Duration (S114). When Duration is not being measured (S113: No), or after S114, the control returns to S101.

As described above, for any of the shock sensor and the RV sensor which detects a detection value exceeding the corresponding slice value, measuring of Duration is started at a timing at which the detection value detected by the sensor exceeds the corresponding slice value (S103: Yes, S104: No, S105). Then, the log generation routine is started at a timing at which Duration exceeds the threshold value D1, and generation of an abnormality log is determined (S106: Yes, S107: No, S108). When the log generation routine is started, the detection values are continuously acquired until collection of all pieces of information constituting the abnormality log is completed. Here, as an example, the detection values are continuously acquired until the determination condition of S113 is not satisfied. However, the condition for stopping the acquisition of the detection values is not limited thereto. For example, when it is desired to continue acquiring the raw waveform for a predetermined time, the detection values may be continuously acquired until the predetermined time elapses. When the collection of all pieces of information constituting the abnormality log is completed, the abnormality log is generated and immediately stored in the FROM 120 and the RAM 121 (S112).

When the determination condition of S103 is satisfied, the CPU 108 may perform various types of processing for preventing an occurrence of a failure of the magnetic disk device 1 in addition to the processing illustrated in FIG. 4.

For example, the CPU 108 may temporarily retract the magnetic head 104 to a position at which the magnetic head 104 suffers damage less frequently. The position at which the magnetic head 104 suffers damage less frequently may be, for example, an area on an inner peripheral side of the magnetic disk 100 or be a position of a ramp load mechanism (not illustrated). Alternatively, the CPU 108 may set a rotation speed of the magnetic disk 100 to be lower than a normal speed.

The abnormality log stored in the RAM 121 is also written to the magnetic disk 100 at a predetermined timing.

Figure 6:
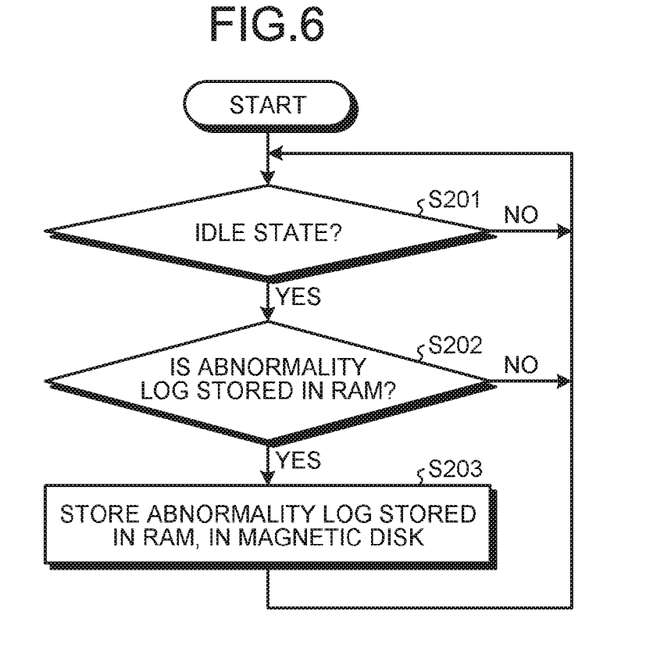
FIG. 6 is a flowchart illustrating an example of an operation of writing the abnormality log in the magnetic disk according to the first embodiment.

FIG. 6 is a flowchart illustrating an example of the operation of writing the abnormality log in the magnetic disk 100 according to the first embodiment.

The CPU 108 determines whether or not the magnetic disk device 1 is in an idle state (S201). The idle state is, for example, a state where there is no unprocessed command among commands received from the host 2. The idle state is not limited thereto.

When the magnetic disk device 1 is in the idle state (S201: Yes), the CPU 108 determines whether or not an abnormality log is stored in the RAM 121 (S202). When the abnormality log is stored in the RAM 121 (S202: Yes), the CPU 108 causes the HDC 107 to store the abnormality log stored in the RAM 121 in the magnetic disk 100 (S203).

When the magnetic disk device 1 is not in the idle state (S201: No), or when no abnormality log is stored in the RAM 121 (S202: No), or after S203, the control returns to S201.

In the above example, the abnormality log stored in the RAM 121 is written to the magnetic disk 100 when the magnetic disk device 1 is in the idle state. The timing at which the magnetic disk device 1 writes the abnormality log stored in the RAM 121 into the magnetic disk 100 is not limited thereto.

As described above, the abnormality log stored in the RAM 121 is written to the magnetic disk 100 after a while from the generation of the abnormality log. In the first embodiment, the abnormality log is also written to the FROM 120 immediately after the generation of the abnormality log. Thus, even though the abnormality log stored in the RAM 121 is lost in the event that a failure occurs in the magnetic disk device 1 or the magnetic disk device 1 is powered off before the abnormality log stored in the RAM 121 is written to the magnetic disk 100, an abnormality log having the similar contents can be obtained from the FROM 120.

Figure 7:
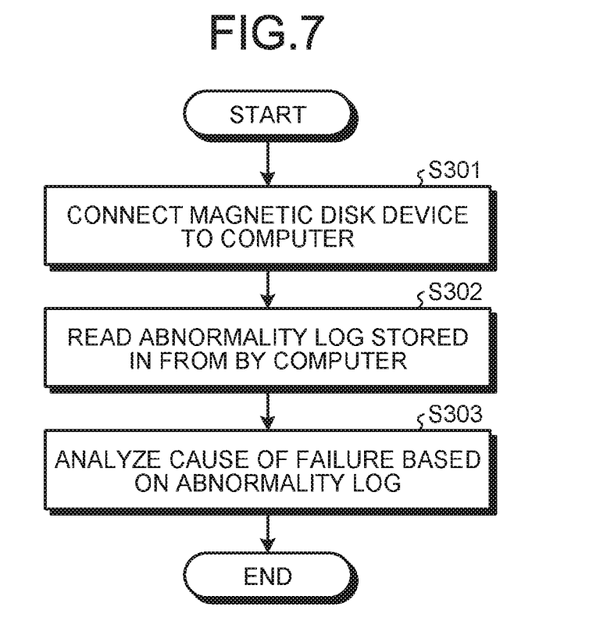
FIG. 7 is a flowchart illustrating an example of an operation of acquiring the abnormality log from a failed magnetic disk device, when a failure occurs in the magnetic disk device, according to the first embodiment.

FIG. 7 is a flowchart illustrating an example of the operation of acquiring the abnormality log from the magnetic disk device 1 in which a failure occurs, when the failure occurs in the magnetic disk device 1, according to the first embodiment.

Firstly, an operator connects the magnetic disk device 1 to a computer (S301). The operator may be a user of the magnetic disk device 1, for example. The operator may be a manufacturer who have received the magnetic disk device 1 returned from the user.

Then, the operator reads an abnormality log stored in the FROM 120 by the computer (S302). The operator may analyze the cause of the failure based on the read abnormality log (S303).

In the above description, a case where the CPU 108 performs abnormality determination and generation of the abnormality log is described. The abnormality determination and the generation of the abnormality log may be performed by the HDC 107. That is, the control board 140 as the controller performs the abnormality determination and the generation of an abnormality log.

The descriptions are made on the assumption that the various sensors are connected to the motor driver IC 109. Some or all of the sensors may be connected to the CPU 108, the HDC 107, and the like.

The descriptions are made on the assumption that the log generation routine maintains an executing state until the collection of all pieces of information constituting the abnormality log is completed. In the log generation routine, the detection values obtained every time the loop processing of S101 to S108 is performed may be stored in the FROM 120 immediately after being acquired, even in a period until the collection of all the pieces of information constituting the abnormality log is completed. The detection value stored in the FROM 120 in the period until the collection of all the pieces of information constituting the abnormality log is completed may be used for the abnormality log.

As described above, according to the first embodiment, the magnetic disk device 1 includes the shock sensor 110 and the RV sensor 111, which are sensors that detect the degree of the physical influences applied from the outside. When the detection value detected by any of the shock sensor 110 and the RV sensor 111 satisfies the condition for abnormality determination, the CPU 108 generates the abnormality log. In response to the generation of the abnormality log, the control board 140 as the controller stores the abnormality log in the FROM 120 which is a non-volatile semiconductor storage device.

Accordingly, even when the magnetic disk device 1 is affected by an abnormal physical influence, and thus the magnetic head 104, the magnetic disk 100, the SPM 101, the motor driver IC 109, the head IC 105, or the like is damaged, and reading of the abnormality log stored in the magnetic disk 100 is not possible, the abnormality log can be acquired from the FROM 120.

Even though any of the above-described components is damaged before the abnormality log stored in the RAM 121 is written to the magnetic disk 100, and thus the abnormality log in the RAM 121 is lost, the abnormality log having the same contents can be acquired from the FROM 120.

Accordingly, the convenience of the magnetic disk device 1 is improved.

In the above descriptions, the CPU 108 determines the trigger for generating the abnormality log based on both the detection value detected by the shock sensor 110 and the detection value detected by the RV sensor 111. The trigger for generating the abnormality log may be determined based on only any one of the detection value detected by the shock sensor 110 and the detection value detected by the RV sensor 111.

In addition, in the event that a period (Duration) in which the detection value detected by the shock sensor 110 or the detection value detected by the RV sensor 111 continuously exceeds the slice value exceeds D1, generation of the abnormality log is triggered. The trigger for generating the abnormality log is not limited thereto.

The abnormality log includes Duration, the maximum value of the detection value, the integrated value of the detection value in Duration, the time when the maximum value in Duration is detected, or the waveform of the detection value. The pieces of information constituting the abnormality log are an example. The abnormality log may include a detection value which is detected by another sensor or numerical information which is obtained by processing the detection value detected by another sensor instead of some or all of the above pieces of information.

Second Embodiment

In the first embodiment, the abnormality log is generated at the timing determined based on the detection values detected by the shock sensor 110 and the RV sensor 111 and is stored in the FROM 120. Various modifications can be made as conditions for generating the abnormality log. In a second embodiment, an example in which the abnormality log is generated based on a detection value detected by the voltage sensor 112 will be described. In the following embodiments, only items different from the items in the first embodiment will be described, and description of the same items as the items in the first embodiment will be omitted.

Figure 8:
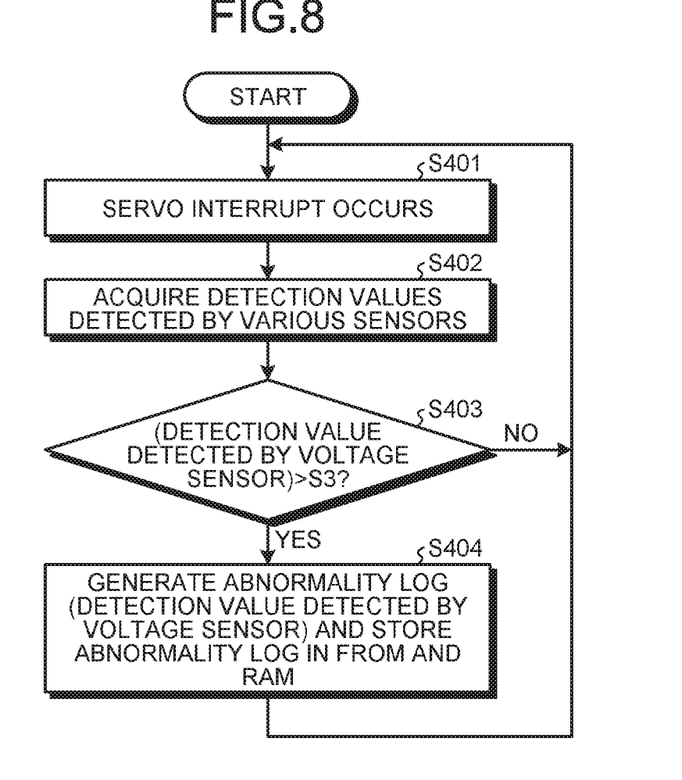
FIG. 8 is a flowchart illustrating an example of an operation of acquiring a detection value detected by a sensor and determining abnormality, according to a second embodiment.

FIG. 8 is a flowchart illustrating an example of an operation of acquiring a detection value detected by a sensor and determining abnormality, according to a second embodiment.

When a servo interrupt occurs (S401), the CPU 108 acquires detection values detected by various sensors (S402). Then, the CPU 108 determines whether or not the detection value detected by the voltage sensor 112 exceeds a slice value S3 (S403). The value S3 is a slice value to be compared with the detection value detected by the voltage sensor 112, and is set in advance.

When the detection value detected by the voltage sensor 112 exceeds the slice value S3 (S403: Yes), the CPU 108 generates an abnormality log, and immediately stores the generated abnormality log in the FROM 120 and the RAM 121 (S404). The abnormality log includes the detection value detected by the voltage sensor 112. The abnormality log may include, in addition to the detection value detected by the voltage sensor 112, numerical information which is obtained by processing the detection value detected by the voltage sensor 112, a detection value which is detected by another sensor, and numerical information which is obtained by processing the detection value detected by another sensor.

When the detection value by the voltage sensor 112 does not exceed the slice value S3 (S403: No), or after the process of S404, the control returns to S401.

The abnormality log stored in the RAM 121 is written to the magnetic disk 100 by the operation illustrated in FIG. 6. The abnormality log stored in the FROM 120 is read out by the operation illustrated in FIG. 7.

As described above, the control board 140 may be configured to generate an abnormality log based on the detection value detected by the voltage sensor 112 that detects the voltage of the electricity supplied to the magnetic disk device 1.

Third Embodiment

In a third embodiment, an example in which an abnormality log is generated based on a detection value detected by the atmospheric pressure sensor 113 will be described.

Figure 9:
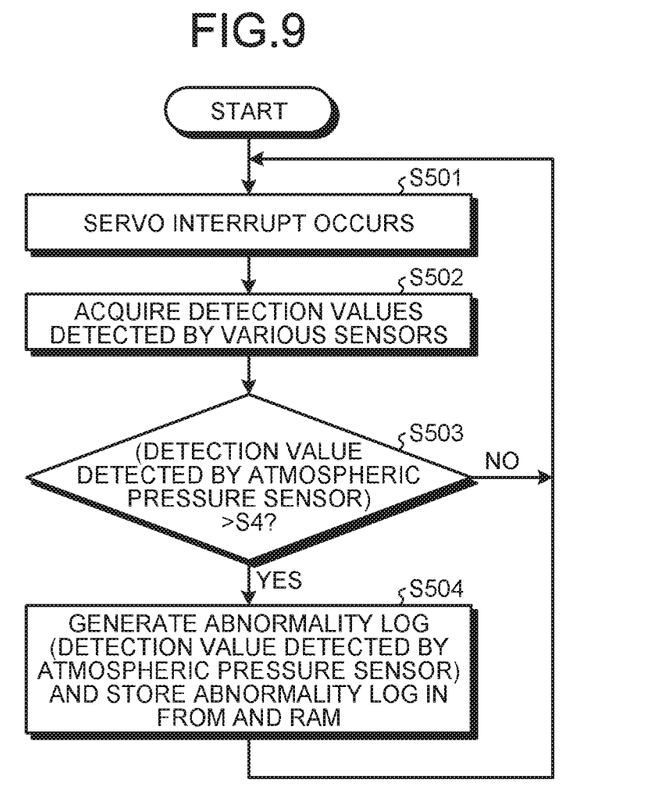
FIG. 9 is a flowchart illustrating an example of an operation of acquiring a detection value detected by a sensor and determining abnormality, according to a third embodiment.

FIG. 9 is a flowchart illustrating an example of an operation of acquiring a detection value detected by a sensor and determining abnormality, according to a third embodiment.

When a servo interrupt occurs (S501), the CPU 108 acquires detection values detected by various sensors (S502). Then, the CPU 108 determines whether or not the detection value detected by the atmospheric pressure sensor 113 exceeds a slice value S4 (S503). The value S4 is a slice value to be compared with a detection value detected by the atmospheric pressure sensor 113, and is set in advance.

When the detection value detected by the atmospheric pressure sensor 113 exceeds the slice value S4 (S503: Yes), the CPU 108 generates an abnormality log, and immediately stores the generated abnormality log in the FROM 120 and the RAM 121 (S504). The abnormality log includes the detection value detected by the atmospheric pressure sensor 113. The abnormality log may include, in addition to the detection value detected by the atmospheric pressure sensor 113, numerical information which is obtained by processing the detection value detected by the atmospheric pressure sensor 113, a detection value which is detected by another sensor, and numerical information which is obtained by processing the detection value by another sensor.

When the detection value by the atmospheric pressure sensor 113 does not exceed the slice value S4 (S503: No), or after the process of S504, the control returns to S501.

Similar to the second embodiment, the abnormality log stored in the RAM 121 is written to the magnetic disk 100 by the operation illustrated in FIG. 6. The abnormality log stored in the FROM 120 is read out by the operation illustrated in FIG. 7.

As described above, the control board 140 may be configured to generate an abnormality log based on the detection value detected by the atmospheric pressure sensor 113 that detects the atmospheric pressure.

Fourth Embodiment

In a fourth embodiment, an example in which an abnormality log is generated based on a detection value detected by the temperature sensor 114 will be described.

Figure 10:
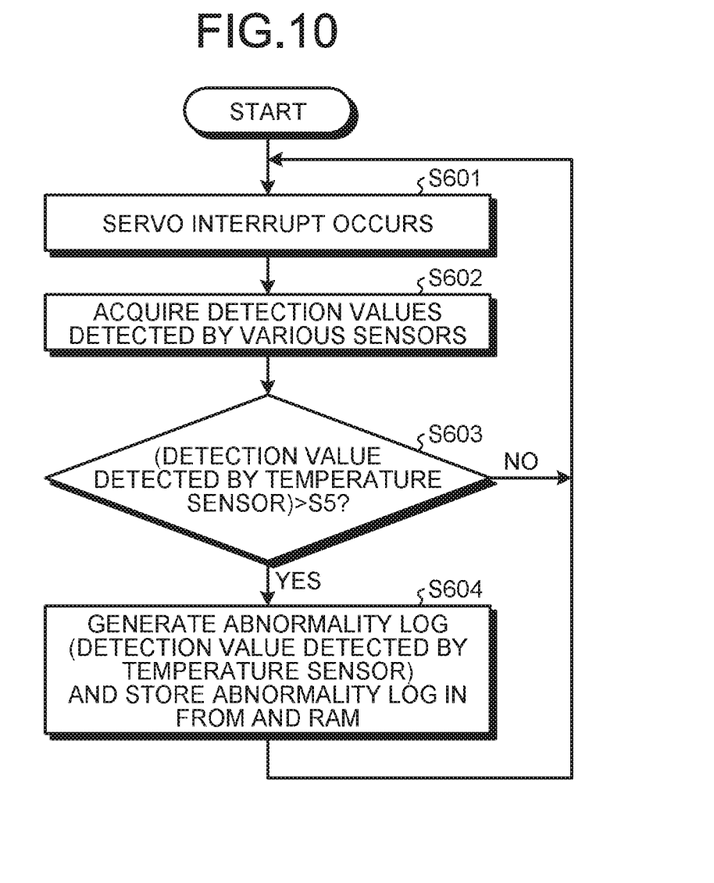
FIG. 10 is a flowchart illustrating an example of an operation of acquiring a detection value detected by a sensor and determining abnormality, according to a fourth embodiment.

FIG. 10 is a flowchart illustrating an example of an operation of acquiring a detection value detected by a sensor and determining abnormality, according to a fourth embodiment.

When a servo interrupt occurs (S601), the CPU 108 acquires detection values detected by various sensors (S602). Then, the CPU 108 determines whether or not the detection value detected by the temperature sensor 114 exceeds a slice value S5 (S603). The value S5 is a slice value to be compared with the detection value detected by the temperature sensor 114, and is set in advance.

When the detection value detected by the temperature sensor 114 exceeds the slice value S5 (S603: Yes), the CPU 108 generates an abnormality log, and immediately stores the generated abnormality log in the FROM 120 and the RAM 121 (S604). The abnormality log includes the detection value by the temperature sensor 114. The abnormality log may include, in addition to the detection value by the temperature sensor 114, numerical information which is obtained by processing the detection value detected by the temperature sensor 114, a detection value which is detected by another sensor, and numerical information which is obtained by processing the detection value detected by another sensor.

When the detection value detected by the temperature sensor 114 does not exceed the slice value S5 (S603: No), or after the process of S604, the control returns to S601.

Similar to the second embodiment, the abnormality log stored in the RAM 121 is written to the magnetic disk 100 by the operation illustrated in FIG. 6. The abnormality log stored in the FROM 120 is read out by the operation illustrated in FIG. 7.

As described above, the control board 140 may be configured to generate an abnormality log based on the detection value detected by the temperature sensor 114 that detects the temperature.

Any two or more of the first to fourth embodiments may be combined. For example, a trigger for generating the abnormality log may be set by a logical sum or a logical product of the triggers described in two or more of the first to fourth embodiments. That is, the controller may generate an abnormality log in accordance with the detection values detected by the sensors.

As described above, according to the first to fourth embodiments, the magnetic disk device includes the sensor, the non-volatile semiconductor storage device, and the controller. The sensor detects the degree of the physical influence applied from an outside. When the detection value detected by the sensor satisfies the condition for abnormality determination, the controller generates the log and stores the log in the non-volatile semiconductor storage device in response to generation of the log.

Thus, even though it is not possible to access the abnormality log stored in the magnetic disk, or a failure occurs in the magnetic disk device before the generated abnormality log is stored in the magnetic disk, the abnormality log can be read out from the non-volatile semiconductor storage device. Accordingly, the convenience of the magnetic disk device is improved.

The controller may store information corresponding to the detection value in the non-volatile semiconductor storage device, in accordance with the detection value detected by the sensor. The information corresponding to the detection value may be the detection value or may be all or some pieces of information described as the example of the abnormality log. The first to fourth embodiments are explained with the example in which, when the controller generates information which corresponds to the detection value, such as the abnormality log, the information is stored in the non-volatile semiconductor storage device in a short time. The information may be stored in the non-volatile semiconductor storage device at any timing after generation of the information.

In such a case, if a failure occurs in the magnetic disk device 1 in a period from when the abnormality log is generated until the abnormality log is stored in the non-volatile semiconductor storage device, it is not possible to acquire the abnormality log. However, after the abnormality log is stored in the non-volatile semiconductor storage device, even though a failure occurs such that an access to the magnetic disk 100 is not possible, the abnormality log can be acquired from the non-volatile semiconductor storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   a magnetic head that performs writing and reading to and from the magnetic disk;
   a sensor that detects a degree of a physical influence applied from an outside;
   a non-volatile semiconductor storage device; and
   a controller that generates a log when a detection value detected by the sensor satisfies a condition for abnormality determination, and stores the log in the non-volatile semiconductor storage device in response to generation of the log, wherein
   the condition is that a period in which the detection value detected by the sensor continuously exceeds a first value exceeds a second value.

2. The magnetic disk device according to claim 1, wherein the sensor includes a shock sensor.

3. The magnetic disk device according to claim 1, wherein the sensor includes a rotational vibration (RV) sensor.

4. The magnetic disk device according to claim 1, wherein the log includes at least one of the period, a maximum value of detection values detected by the sensor in the period, an integrated value of the detection values detected by the sensor in the period, a time at which the maximum value is detected in the period, and a waveform which is formed by the detection values detected by the sensor.

5. A magnetic disk device comprising:
   a magnetic disk;
   a magnetic head that performs writing and reading to and from the magnetic disk;
   a sensor that detects a degree of a physical influence applied from an outside;
   a non-volatile semiconductor storage device; and
   a controller that generates a log when a detection value detected by the sensor satisfies a condition for abnormality determination, and stores the log in the non-volatile semiconductor storage device in response to generation of the log,
   wherein the sensor is a sensor that detects a voltage of electricity supplied to the magnetic disk device, a sensor that detects an atmospheric pressure, or a sensor that detects a temperature.

6. A magnetic disk device comprising:
   a sensor that detects a degree of a physical influence applied from an outside;
   a non-volatile semiconductor storage device; and
   a controller that stores information corresponding to a detection value detected by the sensor in the semiconductor storage device when a period in which the detection value detected by the sensor continuously exceeds a first value exceeds a second value.

7. A method of controlling a magnetic disk device including a magnetic disk, a magnetic head that performs writing and reading to and from the magnetic disk, a sensor that detects a degree of a physical influence applied from an outside, and a non-volatile semiconductor storage device, the method comprising:
   generating a log when a detection value detected by the sensor satisfies a condition for abnormality determination; and
   storing the log in the non-volatile semiconductor storage device in response to generation of the log, wherein
   the condition is that a period in which the detection value detected by the sensor continuously exceeds a first value exceeds a second value.

8. The method according to claim 7, wherein the sensor includes a shock sensor.

9. The method according to claim 7, wherein the sensor includes a rotational vibration (RV) sensor.

10. The method according to claim 7,
    wherein the log includes at least one of the period, a maximum value of detection values detected by the sensor in the period, an integrated value of the detection values detected by the sensor in the period, a time at which the maximum value is detected in the period, and a waveform which is formed by the detection values detected by the sensor.

11. A method of controlling a magnetic disk device including a magnetic disk, a magnetic head that performs writing and reading to and from the magnetic disk, a sensor that detects a degree of a physical influence applied from an outside, and a non-volatile semiconductor storage device, the method comprising:
generating a log when a detection value detected by the sensor satisfies a condition for abnormality determination; and
storing the log in the non-volatile semiconductor storage device in response to generation of the log
wherein the sensor is a sensor that detects a voltage of electricity supplied to the magnetic disk device, a sensor that detects an atmospheric pressure, or a sensor that detects a temperature.

* * * * *